KEYED DIRECT CURRENT REINSERTION CIRCUIT

Filed Dec. 13, 1947

INVENTOR.
RODERIC V. LOWMAN

BY John A. Harvey

ATTORNEY

Patented Nov. 18, 1952 2,618,703

UNITED STATES PATENT OFFICE 2,618,703

KEYED DIRECT CURRENT REINSERTION CIRCUIT

Roderic V. Lowman, New York, N. Y., assignor to Hazeltine Research, Inc., Chicago, Ill., a corporation of Illinois Application December 13, 1947, Serial No. 791,475

4 Claims. (Cl. 178—7.5)

Figures 1, 2, 3:
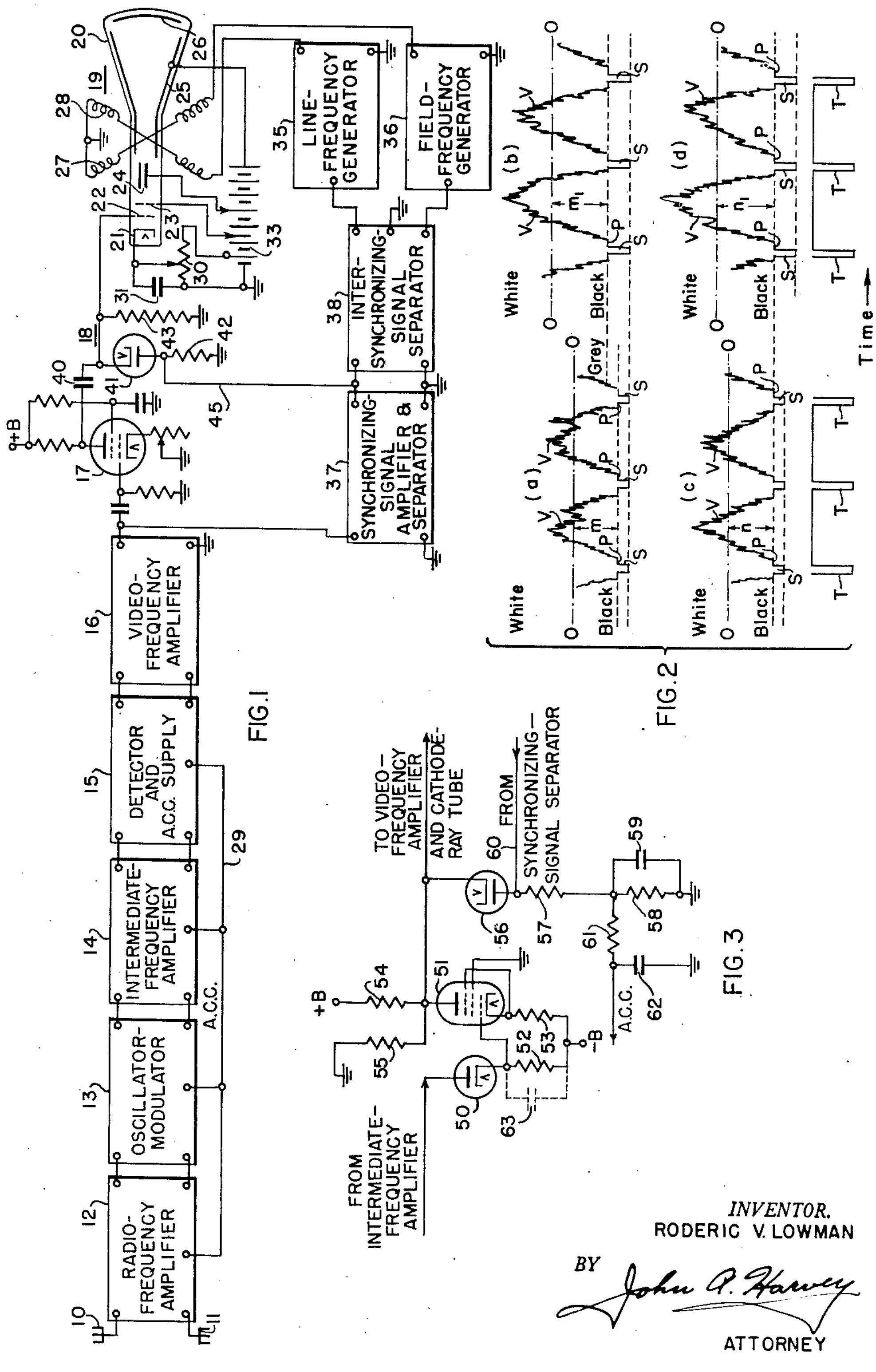

This invention relates to automatic control systems for television arrangements and, more particularly, to systems for automatically controlling one or more operating characteristics of television receivers. The invention is especially directed to automatic-contrast-control systems and to automatic black-level stabilizing systems for maintaining the black level of a television signal at a substantially constant amplitude value regardless of changes in the intensity of the applied television signal.

In accordance with present-day television practice, a transmitted television signal comprises a carrier-wave signal which is modulated during trace intervals by video-frequency and steady components respectively representative of light variations in an image being transmitted and also of its average background illumination. During the intervening retrace intervals, the carrier signal includes pedestal portions having a predetermined amplitude level corresponding to a given shade, which is usually black. The carrier signal is modulated during a portion of this retrace interval by synchronizing-signal components which correspond to the initiations of successive lines and fields in the scanning of an image.

At the receiver an electron beam of an image-reproducing tube is so deflected as to scan a target or screen in a series of fields of parallel lines. The synchronizing-signal components of the received signal are separated from the other modulation-signal components and are utilized to control the scanning apparatus of the receiver so as to synchronize its operation with that of similar apparatus employed at the transmitter in developing the signal. The intensity of the electron beam is controlled by the video-frequency modulation components, thereby to reconstruct the image.

One of the functions preferably performed by a television receiver is the establishment therein of a fixed amplitude or signal level corresponding to a fixed shade level which is usually black. Such a function is conveniently referred to as black-level stabilization. This is to ensure, despite any changes in the intensity of the translated signal, that all video-ferquency modulation components thereof which correspond to the fixed shade level and thus have the aforesaid fixed amplitude will be reproduced with the correct shade in the reproduced image so that light gradations from black to white represented by various other light-modulation values will be properly represented in the reconstructed image.

Some black-level stabilization systems heretofore employed in television receivers have stabilized the translated video signal with respect to a fixed reference level established by the tips of the synchronizing-signal components. Since the synchronizing-signal components are superimposed on the black-level pedestal portions of the television signal, the above-mentioned components extend into a region commonly designated as the infra-black or the blacker-than-black region. Consequently, in a receiver wherein the black level is established from the synchronizing-signal components, the light gradations or shades from black to white represented by the various light-modulation components may not always be faithfully represented in the reconstructed image, unless manual adjustment is relied upon manually to compensate for large changes in the black-level amplitude of the video signal. For example, if the intensity of the received television signal varies due to fading or to a manual adjustment of the receiver gain, the amplitude of the synchronizing-signal components varies and this upsets the action of such a stabilizing system and may require manual readjustment to compensate for the resulting shift of the black level.

Other black-level stabilizing systems in television receivers have stabilized with respect to the black-level pedestal components of the video signal. Some such systems have accomplished this result by eliminating the synchronizing-signal components by a clipping action. This action has proved to be generally unsatisfactory due to excessive distortion which is introduced by the clipping operation. Other black-level stabilization systems which operate on the pedestal pulse have required the use of a greater number of components than is desirable for some applications. One such system of the last-mentioned type is disclosed in United States Letters Patent 2,259,538 granted October 21, 1941, to Harold A. Wheeler, entitled Television Receiver with Automatic Shade-Level Control, and assigned to the same assignee as the present invention. The system there disclosed is coupled to the cathode of a cathode-ray type of picture tube of a television receiver through a peak rectifier which is normally disabled but is made operative only for brief intervals coincident with the duration of the retrace intervals when the synchronizing-signal components are present. The peak rectifier just mentioned is also coupled to the control electrode of the cathode-ray tube through a feed-back circuit including an electrical bridge circuit and a second peak rectifier. An amplifier is provided in this feed-back circuit in order to develop a black-level stabilizing control effect of sufficient magnitude for application to the cathode-ray tube.

Another black-level stabilizing system, which operates on the black-level pedestal pulse of an applied television signal, includes an arrangement for deriving a control signal of pulse wave form each pulse of which is initiated in point of time with a corresponding synchronizing pulse component of the applied signal. The control signal is utilized to control the operation of a pair of diode switches which in turn control the operation of a peak-rectifier system including two pairs of diodes so arranged that a black-level stabilizing control effect is developed which is proportional to the amplitude level of the rear shoulder portions of the pedestal pulses. Manifestly, such a system also requires numerous tubes and other circuit components.

Another important function which preferably is performed in the signal-translating channel of a television receiver is the maintenance of the intensity of the output signal thereof within a relatively narrow range for a wide range of received signal intensities. This function is ordinarily referred to as automatic control of the contrast of the picture detail or, more simply, automatic contrast control. The amplitude level of the peaks of the synchronizing-signal components of a television carrier wave is a measure of the average carrier-wave intensity independent of the light-modulation components. Accordingly, in most television receivers an automatic-contrast-control effect is usually derived in a control system which is responsive to the tips of the synchronizing-signal components of the applied television signal. In accordance with the present invention, however, a similar useful control effect may also be derived from the black-level pedestal portions of a television signal.

It is an object of the invention, therefore, to provide a new and improved system for automatically controlling an operating characteristic of a television receiver.

It is another object of the present invention to provide a new and improved automatic black-level stabilizing system which avoids one or more of the above-mentioned disadvantages and limitations of prior such arrangements.

It is a further object of the invention to provide an automatic black-level stabilizing system, for use in a television arrangement, which is extremely simple in construction yet is capable of producing a black-level stabilizing control effect which varies quite accurately with the variations in the intensity of the television signal translated thereby.

It is yet another object of the invention to provide a new and improved automatic black-level stabilizing system for use in a television receiver which eliminates the need for the continuously adjustable manually operated background-control device usually provided on the front or control panel of the television receiver.

In accordance with a particular form of the invention, a system for automatically controlling an operating characteristic of a television receiver comprises a channel for translating a television signal having video-frequency components, synchronizing-signal components, and fixed-shade-level pedestals. The control system includes a normally operative peak-rectifying system coupled across the channel and having a direction of conductivity corresponding to the direction of amplitude increase of the synchronizing-signal components from the aforesaid fixed shade level. The peak-rectifying system just mentioned includes an energy-storage device, a low-impedance discharging path therefor including a rectifier device and an anode resistor therefor connected in series relation with the rectifier device, and a high-resistance charging path for the energy-storage device including a resistor connected in parallel with the rectifier device and the anode resistor. The system further includes a circuit arrangement coupled across only the anode resistor for periodically applying thereto a control potential of such magnitude, duration and polarity that the rectifier device is effectively disabled during the occurrence of the synchronizing-signal components in said channel to cause the rectifying system to develop a control effect varying substantially only with the amplitude of the above-mentioned fixed shade level of the television signal.

For a better understanding of the present invention, together with other and further objects thereof, reference is had to the following description taken in connection with the accompanying drawing, and its scope will be pointed out in the appended claims.

In the accompanying drawing, Fig. 1 is a circuit diagram, partially schematic, of a television receiving arrangement including an automatic control system in accordance with a particular form of the present invention; Fig. 2 is a graph utilized in explaining the operation of the control system utilized in the Fig. 1 receiver; and Fig. 3 is a circuit diagram of another form of control system in accordance with the invention.

Referring now more particularly to Fig. 1 of the drawing, the television receiving arrangement there represented comprises a receiver of the superheterodyne type including an antenna system 10, 11 coupled to a radio-frequency amplifier 12 of one or more stages. There is coupled to the latter unit in cascade, and in the order named, an oscillator-modulator 13, an intermediate-frequency amplifier 14 of one or more stages, a detector and automatic-contrast-control or A. C. C. supply 15, a video-frequency amplifier 16, an additional stage of video-frequency amplification 17, an automatic control system which may be more specifically referred to as a black-level stabilizing system 18, and a cathode-ray image-reproducing tube 19. The A. C. C. supply circuit 15 is connected to the input circuits of one or more stages of the units 12, 13, and 14 by a control-circuit conductor 29.

The cathode-ray tube 19 comprises the usual envelope 20 containing, in the order named, a cathode 21, a signal-input or control electrode 22, accelerating and focusing electrodes 23 and 24, a second anode 25, and the usual fluorescent screen 26 at the end of the tube. Line-frequency and field-frequency scanning coils 27 and 28 are disposed about the neck of the tube for deflecting the cathode-ray beam in two directions normal to each other. The output circuit of the video-frequency amplifier 17 is coupled to the control electrode 22 of the cathode-ray tube 19 through a coupling condenser 40. The cathode of the latter tube has an operating bias applied thereto through a selectable portion of a voltage divider 30, a by-pass condenser 31 being connected between the cathode of the tube 19 and ground. Operating potentials for the several electrodes of the cathode-ray tube 19 are supplied from a suitable source such as a battery 33.

The output circuit of the video-frequency amplifier 16 is coupled to the input circuit of a line-frequency generator 35 and a field-frequency generator 36 through a synchronizing-signal amplifier and separator 37 and an inter-synchronizing-signal separator 38. The output circuit of the generators 35 and 36 are coupled to the scanning coils 27 and 28, respectively, of the cathode-ray tube 19 in a conventional manner.

The units 10–19, inclusive, and 35–38, inclusive, with the exception of the black-level stabilizing system 18 which is constructed in accordance with the present invention and will presently be described in detail, may be of conventional construction and operation so that a detailed description and explanation of the operation thereof are unnecessary herein.

Considering briefly, however, the general operation of the above-described receiver as a whole, television signals intercepted by the antenna system 10, 11 are selected and amplified in the radio-frequency amplifier 12 and are supplied to the oscillator-modulator 13, wherein they are converted to intermediate-frequency signals. The latter in turn are selectively amplified in the intermediate-frequency amplifier 14 and are delivered to the detector and automatic-contrast-control supply 15. The modulation components of the signal are derived by the detector 15 and are supplied to the cascade-connected video-frequency amplifiers 16 and 17 wherein they are amplified and from which they are supplied to the automatic black-level stabilizing system 18 and to the input circuit of the cathode-ray tube 19. The stabilizing operation of unit 18 will be explained in detail hereinafter. A control voltage derived by the automatic-contrast-control supply of unit 15 is applied as an automatic-amplification-control bias to the gain-control circuits of units 12, 13 and 14 to maintain the signal input to the detector of unit 15 within a relatively narrow range for a wide range of received signal intensities.

Unit 37 selects the synchronizing signals from the other modulation components of the composite television signal applied thereto from the video-frequency amplifier 16. The line-synchronizing and field-synchronizing signals derived by the separator 37 are separated from each other by unit 38 and are then supplied to individual ones of the generators 35 and 36 to synchronize the operation thereof. With proper operating potentials supplied from the battery 33 to the electrodes of the tube 19, an electron beam is produced by the latter and the intensity of this beam is controlled by the control electrode 22 in accordance with the video-frequency and control voltages impressed thereon. Saw-tooth current waves are generated in the line-frequency and field-frequency generators 35 and 36, respectively, and are applied to the scanning coils 27 and 28 to produce scanning fields, thereby to deflect the cathode-ray beam of tube 19 in two directions normal to each other to trace a rectilinear scanning pattern on the screen of the tube and thereby reconstruct the translated picture.

Referring now more particularly to the portion of the receiver embodying the present invention, the automatic-control or black-level stabilizing system 18 comprises a channel for translating the composite television signal including the usual video-frequency components, synchronizing-signal components, and fixed-shade or black-level pedestals. This channel may include a repeater such as the second video-frequency amplifier 17 and includes the output circuit of the repeater and the input circuit of the cathode-ray tube 19. The stabilizing system also includes a normally operative peak-rectifying system which is coupled across the channel in order to have the television signal applied to the rectifying system. This last-mentioned system includes an energy-storage device or condenser 40 in the signal-translating channel and a rectifier device 41 which may be of the diode type having a cathode connected to the junction between the condenser 40 and the control electrode 22 of the cathode-ray tube 19. The anode of the diode 41 is connected to ground through a resistor 42 having a relatively small impedance value. The diode 41 is arranged to have its direction of conductivity correspond to the direction of amplitude increase of the synchronizing-signal components from the fixed shade level thereof. Accordingly, the television signals are applied to the signal-translating channel with such polarity that the tips of the synchronizing-signal components extend in the more negative direction. A resistor 43, having a value of resistance much greater than that of the resistor 42, is connected between the cathode of the diode 41 and ground.

The parameters of the elements 40–43, inclusive, are so selected that they form a conventional peak-rectifying system which is responsive only to the maximum negative amplitude of the signals applied thereto. In particular, the values of the elements 40, 41, and 42 are so selected that the series circuit which includes these elements has, in the conductive direction of the diode 41, a time constant which is shorter than the duration of the line-synchronizing-signal pulse components. On the other hand, the values of the condenser 40 and the resistor 43 are so selected as to provide with the output impedance of the amplifier 17 a time constant which is much longer than the period of recurrence of the field components of the synchronizing-signal components but is shorter than the period of any usual changes in the background intensity of the applied television signal.

The black-level stabilizing system also includes a circuit arrangement coupled to the rectifier device for applying thereto a control potential for disabling the rectifier device during the occurrence of the synchronizing-signal components to cause the rectifying system to develop a control effect, specifically a black-level stabilizing control effect, varying substantially only with the amplitude of the black-level pedestals of the television signal. This circuit arrangement includes the resistor 42 and the output circuit of the unit 37 which is connected across the resistor 42. Unit 37 is arranged to derive a periodic control potential from the television signal supplied to the unit 37 and to apply this control potential with negative polarity across the resistor 42. The periodic control potential developed by unit 37 preferably is of repeated-pulse wave form having a periodicity corresponding to that of the synchronizing-signal components of the signal developed in the output circuit of the video-frequency amplifier 16, having the pulse durations thereof at least equal to the durations of the synchronizing-signal components, and preferably having a pulse amplitude equal to the greatest expected amplitude of the synchronizing-signal components applied to the cathode of the diode 41. This periodic control potential may conveniently comprise the synchronizing components which are derived by the unit 37 from the telivision signal applied thereto and which are translated to the output circuit of the latter unit after suitable amplification therein.

The operation of the stabilizing system represented in Fig. 1, and the results obtained thereby, may be best understood by reference to Fig. 2 of the drawing. Fig 2*a* represents the wave form of a conventional television signal over a period of two scanning intervals and three blanking intervals thereof and as applied through a circuit component effective to translate only alternating-current signals to a conventional black-level stabilizing system which stabilizes the signal on the tips of its synchronizing-signal components. The vdeo-frequency components are indicated at V, the pedestal portions at P, and the synchronizing-signal components at S. Instantaneous variations of the television signal including the video-frequency components V and also the pedestal and synchronizing-signal components P and S take place about an alternating-current axis O—O which varies with the black to white range of the scanned lines in the transmitted image. As previously mentioned, the pedestal portions P of the signal have a fixed reference level corresponding to black in the transmitted image. The synchronizing-signal components extend a predetermined distance beyond this level into the blacker-than-black region. The variation of the black level with reference to the alternating-current axis during the intervals represented is proportional to the distance $m$ between the O—O axis and the black level. A grey level is indicated by the designation grey on the drawing.

Fig. 2*b* represents a television signal applied to a conventional black-level stabilizing system when the field intensity of the carrier wave applied to the detector of unit 15 is greater than that for the signal represented in Fig. 2*a*, or when a manual adjustment is made which increases the gain of the video-frequency amplifier 16 or 17. The variation of the black level with reference to the alternating-current axis O—O, for the scanning interval under consideration, is proportional to the distance $m_1$, which distance is greater than the corresponding distance $m$ represented in Fig. 2*a*. It will be manifest that the level representing black in Fig. 2*b* has a different value from that represented in Fig. 2*a* since the synchronizing-signal components now have a greater amplitude. Consequently, the new black level substantially corresponds with the old grey level shown in Fig. 2*a*. Thus, it will be seen that for conventional black-level stabilizing systems which stabilize with respect to the peaks of the synchronizing-signal components, if the intensity of the applied television signal varies, the amplitude level representing the black level varies correspondingly. Accordingly, components representing black occur at an amplitude level varying with the field intensity of the carrier wave of the television signal applied to the stabilizing system. It will be apparent from this that various signal components representative of shade values from black to white have amplitude values which are not always reproduced properly if the signal amplitude varies.

Considering now the operation of the black-level stabilizing system 18 embodying the present invention, it will be assumed initially that the amplifier 17 is normally conductive in the absence of an applied television signal and that the condenser 40 is charged to a predetermined voltage level from the source indicated +B through the resistor 43. The application of a television signal from the video-frequency amplifier 16 to the input circuit of the amplifier 17, with the tips of the synchronizing-signal components having the maximum positive polarity, increases the flow of space current through the amplifier 17. This reduces the anode potential of the amplifier 17 and the synchronizing-signal components are applied with negative polarity through the condenser 40 to the cathode of the diode 41. Fig. 2*c* illustrates the wave form of a portion of a television signal of a given intensity which is applied to the cathode of the diode 41 from the amplifier 17. Since the diode 41 comprises an element of a peak-rectifying system, the effective negative peaks of the applied television signal render the diode conductive and discharge the condenser 40 to a lower potential level through the low-impedance discharge path including the resistor 42. Substantially coincident with the application of the synchronizing-signal components S to the diode 41, a control potential T derived by the unit 37 is applied across the resistor 42 with negative polarity. Thus, the control potential T is applied to the diode 41 effectively with opposite polarity to the application thereto of the synchronizing-signal components. Since the magnitude of the control potential is at least equal to the greatest expected amplitude of the synchronizing-signal components of the television signal, the diode 41 conducts only on the leading and trailing shoulder portions of the pedestal P and is substantially disabled during the period of application thereto of the synchronizing-signal components. Accordingly, there is developed across the condenser 40 a unidirectional voltage proportional to the peak value $n$ of the pedestal P on the black side of the electrical axis O—O. This voltage is applied with positive polarity to the control electrode of the cathode-ray tube 19 as a black-level stabilizing control effect. During the interval between successive pedestals when the diode 41 is nonconducting, the condenser 40 charges a small amount through the high-impedance charge path including the resistor 43 and the output impedance of the amplifier 17.

Since the rectifying system including the diode 41 is disabled during the intervals in which the synchronizing-signal components S are applied to the stabilizing system, the television signal applied to unit 18 is stabilized on the shoulder portions of the pedestals P of the applied signals, thus establishing in the input circuit of the cathode-ray tube 19 a fixed reference level corresponding to black.

When the amplitude of the television signal applied to the stabilizing system 18 is greater than that considered in connection with Fig. 2*c*, the signal may have the wave form represented in Fig. 2*d*. The operation of the stabilizing system under the last-assumed condition is, however, substantially identical to that explained in connection with Fig. 2*c*. Although the applied synchronizing-signal components S are greater in magnitude, their influence on the diode 41 is again nullified by the action of the large-amplitude negative control-signal components T. Consequently, the television signal applied to the system 18 and to the input circuit of the cathode-ray tube 19 continues to be stabilized with respect to the black-level pedestal P. The developed black-level stabilizing control effect is proportional to the greater amplitude $n_1$ of the black-level pedestal P relative to the electrical axis O—O of the television signal and, hence, this control effect is greater than the effect $n$ for the condition represented in Fig. 2*c*.

Consider briefly the adjustment of the bias potential supplied by the battery 33 to the input electrodes of the cathode-ray tube 19 and assume for simplicity that the video-frequency components of a received television signal applied to the tube 19 all represent black. The voltage divider 30 is adjusted in a direction to apply a more positive voltage to the cathode of the cathode-ray tube 19 to counteract the positive potential supplied to the aforesaid input electrode by the condenser 40. This adjustment should be sufficient to produce a net bias potential which biases the cathode-ray tube substantially to cut-off. The resultant net bias applied between the control electrode 22 and the cathode 21 of the cathode-ray tube 19 is thereafter automatically maintained at this value for a signal level which corresponds to that of the black-level pedestals. Thereafter the television signal applied to the input electrodes of the cathode-ray tube 19 and having components in any portion of the range or shade values from black to white is reproduced on the screen 26 of the cathode-ray tube with proper fidelity.

In a conventional television receiver, the so-called background or brightness control which adjusts the average illumination of the image on the cathode-ray tube is accomplished by means of a control on the front panel of the receiver. This control corresponds in function to that of the voltage divider 30 in the arrangement represented in Fig. 1. In view of the somewhat faulty representation of various shade values from black to white with changes in the intensity of the television signal applied to the cathode-ray tube of a conventional television receiver, due to the characteristic operation of the black-level stabilization system thereof, it is usually necessary to make the brightness control continuously adjustable at the will of the operator so that the brightness of the image on the cathode-ray tube may be adjusted to suit his particular liking. The superior black-level stabilization characteristics of a control system in accordance with the Fig. 1 embodiment of the present invention eliminates the need for this control on the front panel of the receiver. The voltage divider 30 may be mounted on the chassis and a single factory adjustment only, in the manner mentioned above, establishes the proper brightness for any image produced on the screen of the cathode-ray tube. This factory adjustment is ordinarily made desirable to take care of slight differences in the cutoff bias found in individual cathode-ray tubes of the same type.

By connecting the unit 37 to a point in the signal-translating channel preceding the stabilizing system 18, namely to the input circuit of the video-frequency amplifier 17 rather than to the output circuit thereof, undesirable interaction, which might result by virtue of the fact that both electrodes of the diode 41 derive energy from the same output circuit, is avoided, thus affording improved operation.

While applicant does not wish to be limited to any particular circuit values for the embodiment of the invention described above, there follows a set of representative values which may be utilized in the black-level stabilizing system of Fig. 1:

| | |
|---|---|
| Condenser 40 | 0.05 microfarad |
| Resistor 42 | 5000 ohms |
| Resistor 43 | 1.5 megohms |
| Tube 41 | Type 6AL5 (duplex diode) |
| Periodic control potential applied to the anode of tube 41 from unit 37 (duration of potential pulses thereof corresponds to that of synchronizing-signal components) | −30 volts |
| Approximate peak-to-peak amplitude of television signal applied to tube 41 from amplifier 17 | 65 volts |

Referring now to Fig. 3 of the drawing, there is represented schematically an embodiment of the invention which is adapted to control another operating characteristic of a television receiver. Specifically, the arrangement there represented may be employed as an automatic-contrast-control system for a television receiver similar to the receiver represented in Fig. 1. The manner of connection between the present control system and the various units of such a television receiver is indicated by suitable legends. A diode detector 50 and a pentode-type amplifier 51 are included in the television signal-translating channel between the output circuit of the intermediate-frequency amplifier of the television receiver and the input circuit of the video-frequency amplifier thereof. The detector 50 includes a load resistor 52 which is connected between the cathode of the detector and a negative source of potential indicated as −B. A condenser 63, represented in broken lines since it may be comprised in whole or in part of the distributed capacitance of the resistor or other inherent capacitances associated therewith, is connected in shunt with the load resistor 52. A resistor 53 is coupled between the cathode of the amplifier 51 and the source indicated as −B while a resistor 54 is coupled between the anode of the tube 51 and a source of potential indicated as +B. A voltage-dropping resistor 55 is coupled between the anode of the tube 51 and ground. The resistors 53–55, inclusive, have values so proportioned relative to the magnitudes of the potentials of the sources indicated as +B and −B that the anode of the tube 51 has a potential value which is ordinarily slightly above ground potential. The screen electrode of tube 51 is grounded and the suppressor electrode thereof is connected directly to the cathode. The cathode of the diode 50 is connected directly to the control electrode of the tube 51 to provide a conductive or direct-current path between the respective output and input circuits of the tubes 50 and 51.

A normally operative peak-rectifying system is coupled across the signal-translating channel between the tube 51 and a succeeding video-frequency amplifier. This rectifier system includes a diode rectifier 56 having a cathode which is connected directly to the anode of the tube 51 and an anode which is connected to ground through series-connected load resistors 57 and 58. A condenser 59 is connected in shunt with the resistor 58. The elements 57, 58, and 59 have values which approximately correspond with those of the similar elements 42, 43, and 40, respectively, in the Fig. 1 embodiment. The diode rectifier 56 is so poled with respect to the television signal applied thereto from the direct-current amplifier 51 that only the negative amplitudes of the applied television signal in the region of the synchronizing-signal components cause peak rectification.

The output circuit of the synchronizing-signal separator of the television receiver is coupled to the anode of the diode rectifier 56 by a conductor 60 for disabling the rectifier system during the occurrence of the synchronizing-signal components. The conductor 60 is thus effective to apply negatively poled synchronizing-signal components, preferably derived in a manner similar to that represented in Fig. 1, to the anode of the diode rectifier 56. A conventional filter network including a series-connected resistor 61 and a shunt-connected condenser 62 is connected to the junction of the resistors 57 and 58 to derive the undirectional component of the control effect developed across the resistor 58 by peak rectification. The output terminal of the filter network is connected in a well-known manner through the conductor indicated as A. C. C. to the input circuits of one or more of the preceding stages of the television receiver which may correspond to the units 12–14, inclusive, represented in Fig. 1.

Consider now the operation of the automatic-contrast-control system represented in Fig. 3 and assume that an intermediate-frequency television signal is applied from the preceding intermediate-frequency amplifier to the detector 50. The modulation-frequency components, including the video-frequency components and the synchronizing-signal components which are superimposed on the fixed shade or black-level pedestals, are derived across the load resistor 52 in conventional manner. The modulation-frequency components are applied, with the synchronizing-signal components extending in the positive direction, directly to the input circuit of the direct-current amplifier 51. Since the connection between the load resistor 52 and the input circuit of the amplifier 51 is a direct one, a unidirectional signal is applied to the amplifier. The signal translated by the amplifier 51 undergoes a 180-degree phase reversal therein. Hence, the output signal thereof is applied to the cathode of the diode rectifier 56 with the synchronizing-signal components extending in a negative direction. Substantially coincident with the application of the negative synchronizing-signal components of the television signal to the cathode of the diode rectifier 56, negative potential pulses from the synchronizing-signal separator are applied by the conductor 60 to the anode of the diode rectifier 56. Since each of these negative potential pulses has a magnitude and a duration at least equal to that of a corresponding synchronizing-signal pulse which is applied to the cathode of the diode rectifier 56, the diode rectifier is disabled during the occurrence of the synchronizing-signal components. Consequently, the diode rectifier 56 is enabled to peak-rectify only on the leading and trailing shoulder portions of the periodically recurring pedestals of the applied television signal, thereby developing across the resistor 58 a negative unidirectional control effect or bias potential which has a value proportional to and varying with the amplitude of the black-level pedestal portions of the intermediate-frequency signal applied to the diode rectifier 50.

The amplitude level of these pedestal portions is a measure of the average amplitude of the carrier component of the television signal applied to the television receiver and this level is independent of the light-modulation components of the signal. Therefore the negative control effect developed across the resistor 58 may be employed after translation through the filter network 61, 62 to control a characteristic of the television receiver, such as the amplification thereof, to maintain the intensity of the signal applied to the detector 50 within a relatively narrow range for a wide range of received signal intensities. This has the effect of automatically controlling the contrast of the reproduced image. Thus the conventional stages in the television signal-translating channel preceding the detector 50 comprise means for utilizing the control effect developed across the resistor 58 for controlling an operating characteristic of the television receiver.

From the foregoing descriptions of the various embodiments of the invention, it will be apparent that automatic control systems in accordance with the present invention may be employed automatically to control one or more operating characteristics of a television receiver, specifically its black-level stabilization and the contrast of its reproduced image. From the description of the Fig. 1 arrangement, it will also be manifest that a black-level stabilizing system in accordance with the present invention is extremely simple in construction yet is capable of producing a black-level stabilizing control effect which varies correctly with variations in the intensity of the television signal applied thereto. A black-level stabilizing system in accordance with the invention not only provides a superior black-level stabilizing action, but also eliminates the need for the usual adjustable brightness control on the front panel of a television receiver.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for automatically controlling an operating characteristic of a television receiver comprising: a channel for translating a television signal having video-frequency components, synchronizing-signal components, and fixed-shade-level pedestals; a normally operative peak-rectifying system coupled across said channel and having a direction of conductivity corresponding to the direction of amplitude increase of said synchronizing-signal components from said fixed shade level; said rectifying system including an energy-storage device, a low-impedance discharging path therefor including a rectifier device and including an anode resistor therefore connected in series relation with said rectifier device, and a high-resistance charging path for said energy-storage device including a resistor connected in parallel with said rectifier device and said anode resistor; and a circuit arrangement coupled across only said anode resistor for periodically applying thereto a control potential of such magnitude, duration and polarity that said rectifier device is effectively disabled during the occurrence of said synchronizing-signal components in said channel to cause said rectifying system to develop a control effect varying substantially only with the amplitude of said fixed shade level of said signal.

2. A system for automatically controlling an operating characteristic of a television receiver comprising: a channel for translating a television signal having video-frequency components, synchronizing-signal components, and fixed-shade-level pedestals; a normally operative peak-rectifying system coupled across said channel and having a direction of conductivity corresponding to the direction of amplitude increase of said synchronizing-signal components in a negative direction from said fixed shade level; said rectifying system including a condenser, a low-impedance discharging path therefor including a diode rectifier device and including an anode resistor therefor connected in series relation with said rectifier device, and a high-resistance charging path for said condenser including a resistor connected in parallel with said rectifier device and said anode resistor; and a circuit arrangement coupled across only said anode resistor for periodically applying thereto a negative control potential of such magnitude and duration that said rectifier device is effectively disabled during the occurrence of said synchronizing-signal components in said channel to cause said rectifying system to develop a control effect varying substantially only with the amplitude of said fixed shade level of said signal.

3. An automatic black-level stabilizing system for a television receiver comprising: a channel for translating a television signal having video-frequency components, synchronizing-signal components, and black-level pedestals; a normally operative peak-rectifying system coupled across said channel and having a direction of conductivity corresponding to the direction of amplitude increase of said synchronizing-signal components from said black level thereof; said rectifying system including a condenser, a discharging path therefor including a rectifier device and including a resistor having a low-impedance value connected in series relation with said rectifier device, and a charging path for said condenser including a resistor having a high-impedance value connected in parallel relation with said rectifier device and said first-mentioned resistor; and a circuit arrangement coupled across only said first-mentioned resistor for periodically applying thereto a control potential of such magnitude, polarity and duration that said rectifier device is effectively disabled during the occurrence of said synchronizing-signal components to cause said rectifying system to develop a black-level stabilizing control effect varying substantially only with the amplitude of said black-level pedestals.

4. An automatic black-level stabilizing system for a television receiver comprising: a channel for translating a television signal having video-frequency components, synchronizing - signal components, and black-level pedestals; a normally operative peak-rectifying system coupled across said channel and having a direction of conductivity corresponding to the direction of amplitude increase of said synchronizing-signal components from said black level; said rectifying system including a condenser, a discharging path therefor including a rectifier device and including a resistor having a low-impedance value connected in series relation with said rectifier device, and a charging path for said condenser including a resistor having a high-impedance value connected in parallel relation with said rectifier device and said first-mentioned resistor; a circuit arrangement coupled across only said first-mentioned resistor for periodically applying thereto a control potential of such magnitude, duration and polarity that said rectifier device is effectively disabled during the occurrence of said synchronizing-signal components in said channel to cause said rectifying system to develop a black-level stabilizing control effect varying substantially only with the amplitude of said black-level pedestals; and means coupled to said channel for utilizing both said television signal and said control effect.

RODERIC V. LOWMAN.

REFERENCES CITED

The following references are of record in the file of this patent:

UNITED STATES PATENTS

| Number | Name | Date |
|---|---|---|
| 2,158,261 | Urtel et al. | May 16, 1939 |
| 2,227,001 | Schlesinger | Dec. 31, 1940 |
| 2,227,056 | Blumlein et al. | Dec. 31, 1940 |
| 2,240,534 | Wilson | May 6, 1941 |
| 2,241,553 | Kallman et al. | May 13, 1941 |
| 2,244,240 | Blumlein | June 3, 1941 |
| 2,252,746 | Willan | Aug. 19, 1941 |
| 2,259,538 | Wheeler | Oct. 21, 1941 |
| 2,296,393 | Martinelli | Sept. 22, 1942 |
| 2,302,425 | Deerhake | Nov. 17, 1942 |
| 2,307,387 | Blumlein | Jan. 5, 1943 |
| 2,525,106 | Wendt | Oct. 10, 1950 |
| 2,543,037 | Mayle | Feb. 27, 1951 |

FOREIGN PATENTS

| Number | Country | Date |
|---|---|---|
| 510,715 | Great Britain | Aug. 4, 1939 |
| 845,897 | France | Sept. 4, 1939 |